US006621778B1

United States Patent
Lu et al.

(10) Patent No.: US 6,621,778 B1
(45) Date of Patent: Sep. 16, 2003

(54) AUTOMATIC CALIBRATION OF THE OUTPUT POWER OF A PICKUP HEAD FOR AN OPTICAL INFORMATION RECORDING APPARATUS

(75) Inventors: Shu-Tai Lu, Taoyuan (TW); Kuang-Yang Chuang, Kaohsiung (TW); Jyh-Shong Ju, Taipei (TW); Feng-Hsiang Lo, Taipei (TW); Kuo-Ding Shin, Taichung (TW); Yong-Long Lee, Pingtung (TW); Ching-Ping Kuei, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 453 days.

(21) Appl. No.: 09/721,797

(22) Filed: Nov. 24, 2000

(30) Foreign Application Priority Data

Jun. 15, 2000 (TW) ........................ 89111693 A

(51) Int. Cl.$^7$ ................................. G11B 7/12
(52) U.S. Cl. .................... 369/47.5; 369/53.26; 369/116
(58) Field of Search ................. 369/47.5, 47.51, 369/47.53, 47.52, 53.11, 53.26, 53.37, 53.21, 85, 116, 121, 215

(56) References Cited

U.S. PATENT DOCUMENTS

| 4,507,767 | A | * | 3/1985 | Takasugi ................. 369/53.26 |
| 5,029,155 | A | * | 7/1991 | Kenjo ........................ 369/116 |
| 5,175,722 | A | * | 12/1992 | Minami et al. ............. 369/116 |
| 5,197,059 | A | * | 3/1993 | Minami et al. ............. 369/116 |
| 5,231,625 | A | * | 7/1993 | Hokozono et al. .......... 369/116 |
| 6,134,209 | A | * | 10/2000 | Den Boef ................. 369/47.53 |

* cited by examiner

Primary Examiner—Richemond Dorvil
Assistant Examiner—Jorge L. Ortiz-Criado
(74) Attorney, Agent, or Firm—W. Wayne Liauh

(57) ABSTRACT

This specification discloses an automatic calibration method for the output power of a pickup head for an optical information recording apparatus, which avoids laser diode thermal effects using duty cycle control and obtains the correct conversion function between the output current of a front monitor diode and the output power of the pickup head by curve fitting. This method only needs to measure one set of front monitor diode output current and output power conversion function of the pickup head. The same conversion function is applicable to all pickup heads of the same type. The optical information recording apparatus automatically detects the corresponding parameter for the pickup head. Each optical information recording apparatus can also automatically detect the specific power control parameters for each set of power control channel to obtain the optimal recording characteristics.

16 Claims, 4 Drawing Sheets

AUTOMATIC CALIBRATION OF THE OUTPUT POWER OF A PICKUP HEAD FOR AN OPTICAL INFORMATION RECORDING APPARATUS

BACKGROUND OF THE PRESENT INVENTION

1. Field of Invention

The present invention relates to an automatic calibration method for the output power of a pickup head for an optical information recording apparatus. More particularly, it relates to a method that uses curve fitting technology to obtain the correct conversion function between the output current of a front monitor diode and the output power of the pickup head, with which optical information recording apparatuses of the same type can automatically detect the specific power control parameters for corresponding pickup heads thereof.

2. Related Art

Currently, the common write strategy for optical information recording apparatuses adopts the method of multi-pulse/multi-level. The write power is determined by the optimal power calibration (OPC).

The OPC is to first write data on a small segment of an optical disc according to the write strategy and the information prerecorded and then to obtain the corresponding optimal power control parameters, so that the optical information recording apparatus can have the optimal recording characteristics.

The so-called "multi-pulse/multi-level" is obtained by controlling the ON/OFF timing and power level of each power control channel on the optical information recording apparatus. If the characteristics of each power control channel differ from one another, then the optical information recording apparatus also has different parameters for each respective set of power control channel. Besides, since the characteristics of each laser diode drive and the characteristic of each pickup head vary, the power control channel input parameter for different optical information recording apparatuses will be different from one another too.

To obtain the optimal recording characteristics for every optical information recording apparatus, the power control channel of each optical information recording apparatus should have corresponding specific power control parameters in principle. To obtain these specific power control parameters, the characteristics of each pickup head has to be calibrated after finishing the optical information recording apparatus installation. This inevitably increases the trouble in mass-producing optical information recording apparatuses.

A conventional method of solving this problem is to select an average of the relationship between the output power and the input specific power control parameters from statistical viewpoint. Although this cannot ensure that each pickup head obtains the optimal recording characteristics, the specific power control parameters thus found is not very far from the optimal one.

SUMMARY OF THE PRESENT INVENTION

To obtain the optimal recording characteristics for every optical information recording apparatus, each set of power control channel of each optical information recording apparatus should have corresponding specific power control parameters in principle. To obtain these specific power control parameters, the characteristics of each pickup head has to be calibrated after finishing the optical information recording apparatus installation.

It is a primary object of the present invention to provide an automatic calibration method for the output power of a pickup head for an optical information recording apparatus, which prevents the disturbance of individual pickup head characteristics measurement during the manufacturing processes. In particular, it enables each optical information recording apparatus to automatically measure the specific power control parameters of each set of power control channel so as to obtain the optimal recording characteristics.

The automatic calibration method for the output power of a pickup head for an optical information recording apparatus avoids laser diode temperature rising effects using duty cycle control and obtains the correct conversion function between the output current of a front monitor diode and the output power of the pickup head by curve fitting. This method only needs to measure one set of front monitor diode output current and output power conversion function of the pickup head. The same conversion function is applicable to all pickup heads of the same type. The optical information recording apparatus automatically detects the corresponding parameter for the pickup head. Each optical information recording apparatus can also automatically detect the specific power control parameters for each set of power control channel to obtain the optimal recording characteristicss.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE PRESENT INVENTION

Figure 1:
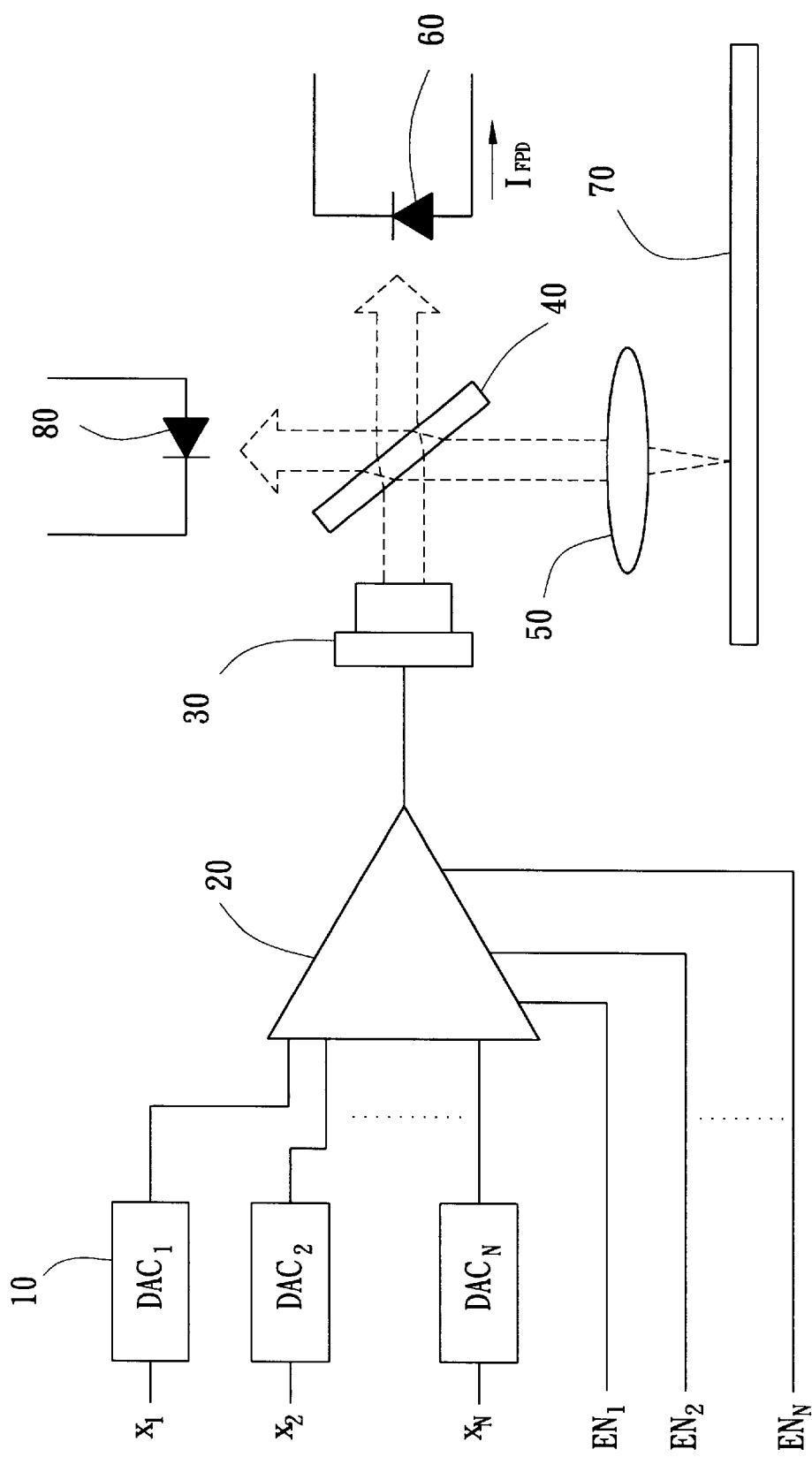
FIG. 1 is a block diagram showing the structure of a pickup head for an optical information recording apparatus.

FIG. 1 is a block diagram showing the structure of a pickup head for an optical information recording apparatus. The pickup head comprises a digital-analogue converter (DAC) 10, a laser diode driving chip 20, a laser diode 30, a beam splitter 40, a convergent lens 50, a front monitor diode 60 and a PDIC 80.

The laser diode driving chip 20 contains a plurality of analogue input channels, each of which corresponds to a DAC 10 and an enable input. The input values ($X_1$, $X_2$, $X_N$) of the DAC 10 can control the magnitudes of the laser diode 30 output peak powers ($P_o$, $P_1$, $P_2$). The enable input values ($EN_1$, $EN_2$, $EN_N$) control the time intervals of the laser diode 30 output peak powers ($P_o$, $P_1$, $P_2$). The conversion function from each channel input X to the laser output $P_o$ can have a different weighting. After the laser diode driving chip 20 sums up the enabled channels, the laser diode 30 is driven to emit laser. After the beam splitter 40, the laser beam is separated into two parts, one directly radiating on the front monitor diode 60 while the other radiating on the optical storage medium 70 after passing through the convergent lens 50. The laser beam reflected from the optical storage medium 70 finally reaches the PDIC 80 for the optical information recording apparatus to perform subsequent signal processing.

Since an optical information recording apparatus is composed of many devices, giving the same specific parameter X for different optical information recording apparatus pickup head may result in very different output peak power $P_o$ from the laser diode 30. Thus, for a particular output peak power, different optical information recording apparatuses will obtain respective specific power control parameters according to the conversion properties of each power control channel. To obtain the optimal recording characteristics for every optical information recording apparatus, each set of power control channel of each optical information recording apparatus should have a corresponding specific parameter in principle. To obtain these specific power control parameters, the characteristics of each pickup head has to be calibrated after finishing the optical information recording apparatus installation. This inevitably increases the trouble in mass-producing optical information recording apparatuses.

To solve the above trouble, the present invention selects the average value of the relation curves between a set of front monitor diode output currents and pickup head output power, from which the conversion function of such channel is obtained. The optical information recording apparatus automatically detects the specific parameter corresponding to its pickup head. This then avoids the disturbance of individually measuring the pickup head characters during the manufacturing processes. Each optical information recording apparatus can automatically measure and obtain the specific parameter for each set of power control channel so as to have the optimal recording characteristics.

Figure 2:
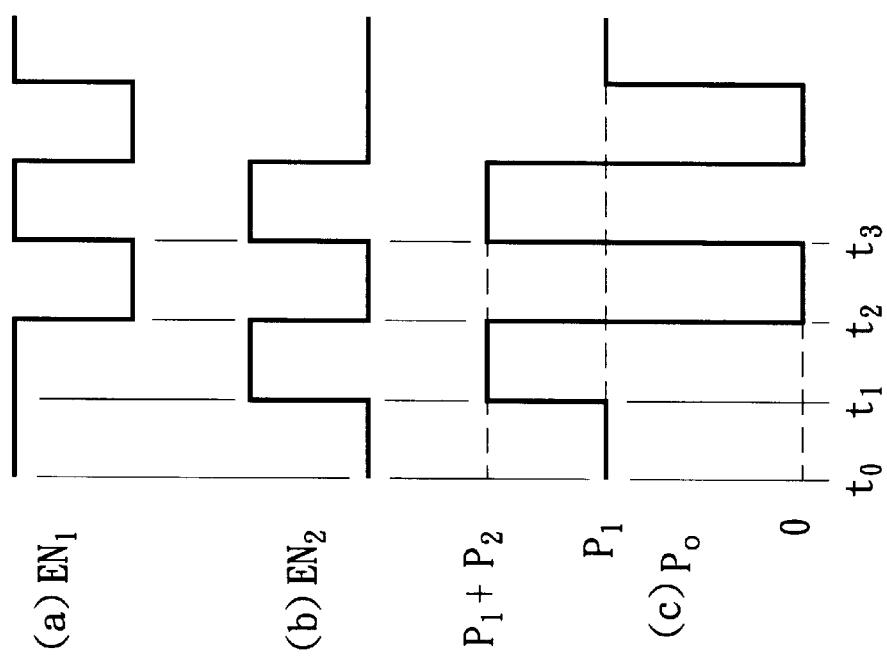
FIG. 2 is a schematic view of the multi-pulse/multi-level recording method of an optical storage medium.

FIG. 2 is a schematic view of the multi-pulse/multi-level recording method of an optical storage medium. Currently, the common write strategy for optical information recording apparatuses takes the method of multi-pulse/multi-level. The write power is determined by the optimal power calibration (OPC).

The OPC is to first write data on a small segment of an optical disc according to the information provided by the optical disc manufacturer and then to obtain the optimal power control parameter for the pickup head, so that the pickup head can obtain the optimal power control parameter therefrom. A numerical value is input into $X_1$ and only $EN_1$ is enabled, the output peak power of the laser diode 30 can reach $P_1$. Similarly, if a numerical value is input into $X_2$ and only $EN_2$ is enabled, the output peak power of the laser diode 30 can reach $P_2$. If both $EN_1$ and $EN_2$ are simultaneously enabled and the input numerical value at $X_2$ subtracts off the nonlinear part, then the output peak power of the laser diode 30 can reach $P_1+P_2$. From FIG. 2, one can see that (a) is the control signal of $EN_1$, (b) is the control signal of $EN_2$, and (c) is the wave shape of the laser diode 30 output peak power $P_o$.

The automatic calibration method for the output power of a pickup head for an optical information recording apparatus avoids thermal effects of laser diode using duty cycle control and obtains the correct conversion function between the output current of a front monitor diode and the output power of the pickup head by curve fitting. This method only needs to measure one set of front monitor diode output current and output power conversion function of the pickup head. The same conversion function is applicable to all pickup heads of the same type. The optical information recording apparatus automatically detects the corresponding parameter for the pickup head. Each optical information recording apparatus can also automatically detect the specific power control parameters for each set of power control channel to obtain the optimal recording characteristics. The reason that a front monitor diode 60 is taken as the standard for measurements is that the characteristics of a single device is more consistent and more easily controlled than the whole set of pickup head.

Figure 3:
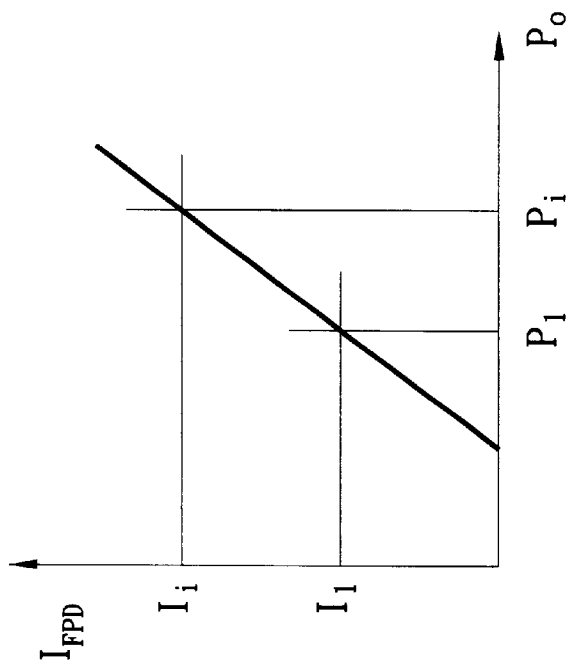
FIG. 3 shows the relation between the output current of a front monitor diode and the output power of the pickup head.

As shown in FIG. 1, replacing the optical storage medium 70 with an optical power meter the laser beam originally radiating on the optical disc is now radiating on the optical power meter. The optical information recording apparatus gradually adjusts the input value $X_1$ on the DAC 10 and records the reading $P_1$ on the optical power meter and the output current $I_1$ of the front monitor diode 60. When the optical power meter reads $P_i$, the output current of the front monitor diode 60 is $I_i$. Accordingly, one can obtain the relation between the output current of the front monitor diode and the output power conversion function $I_{FPD}(P_o)$ of the pickup head shown in FIG. 3 by curve fitting. This conversion function $I_{FPD}(P_0)$ will be written into an automatic power calibration program as the reference for power calibration.

Figure 4:
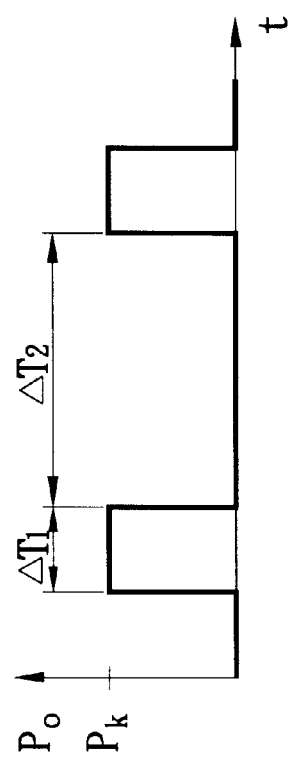
FIG. 4 shows the waves of the laser diode output power.

The output power of the laser diode 30 will decrease as the temperature increases when operating under a constant current, this will affect the accuracy of the conversion function measurement. In practice, when the average output power $P_{av}$ of the laser diode 30 is smaller than or equal to a critical power value $P_t$ the thermal effect can be ignored. Therefore, when the present invention measures the output current of the front monitor diode 60 and the output power conversion function $I_{FPD}(P_o)$ of the pickup head, it takes the duty cycle control method (FIG. 4) to avoid the temperature rise in the laser diode 30. $\Delta T_1$ and $\Delta T_2$ are determined so that the laser diode 30 continuously outputs periodic pulses, with the average output power smaller than or equal to $P_t$, to measure the characteristics of the pickup head. The reason for using continuous periodic pulses is to obtain statistically meaningful measurement results.

The optical information recording apparatus manufacturer can easily set the values of the laser diode 30 conducting time interval $\Delta T_1$ and the laser diode 30 closure time interval $\Delta T_1$ according to experience, thus controlling the enable inputs $EN_1$, $EN_2$, and $EN_N$ of the laser diode driving chip 20 so that the average output power of the laser diode 30 does not exceed the critical value and the thermal effect can be ignored in the whole pickup head characteristics measurement range. A peak holder in the optical information recording apparatus is employed to measure the peak current $I_k$ corresponding to the output power peak $P_k$ of the pickup head. One can also measure the output power average $P_{av}$, without using the peak holder. The output power peak $P_k$ can be calculated as follows:

$$P_k = P_{av} \times (\Delta T_1 + \Delta T_2)/\Delta T_1.$$

Figure 5:
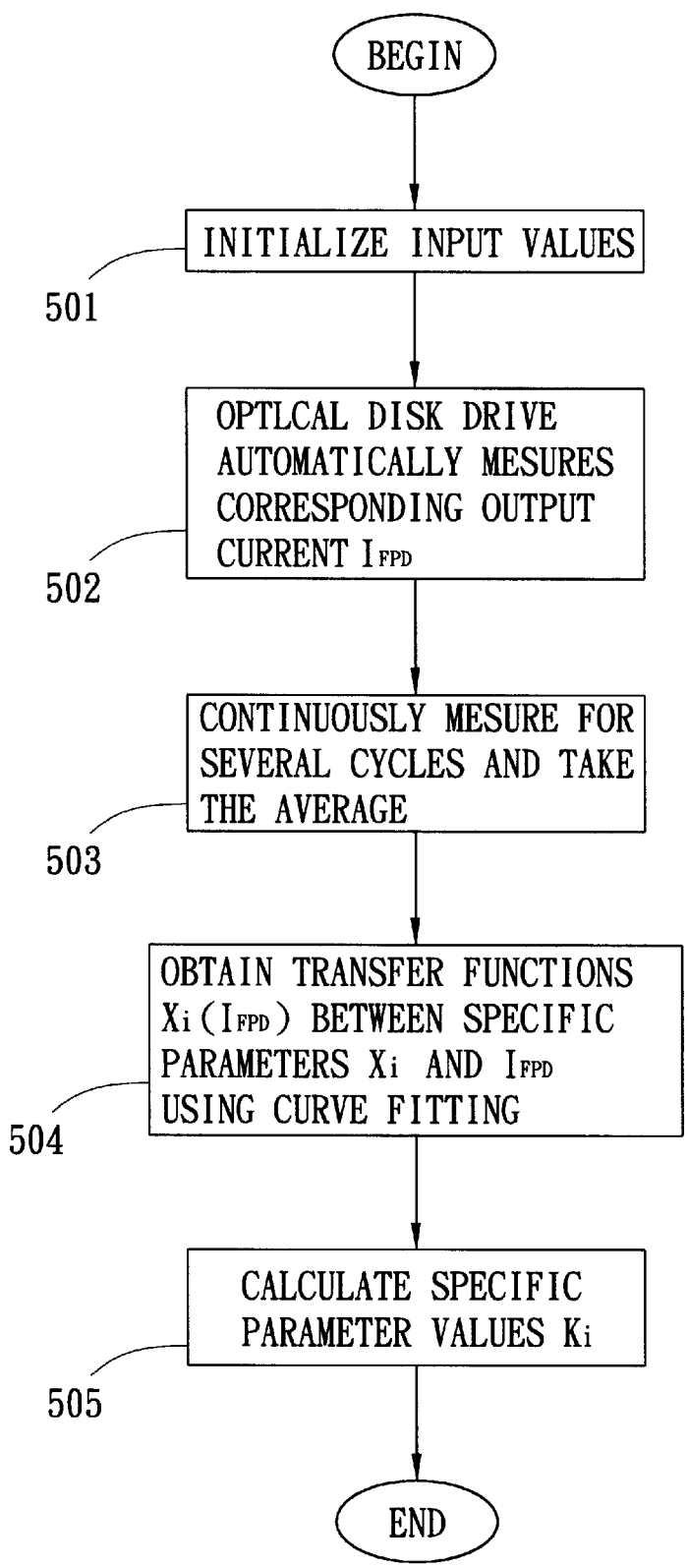
FIG. 5 is a flow chart of automatic measuring specific power control parameters $K_i$ according to the present invention.

FIG. 5 is a flow chart of automatic measuring specific power control parameters $K_i$ according to the present invention, which is exactly the procedure for automatically determining the conversion function $X_i(I_{FPD})$ of each power control channel and the specific power control parameters $K_i$. First, input values are initialized (step 501) and the optical information recording apparatus automatically measures the corresponding current $I_{FPD}$ (step 502). The $X_i$ in each step is controlled by the above-mentioned duty cycle control method to avoid the temperature from rising in the laser diode 30. The measurement is continued for several cycles and the results are averaged (step 503). Curve fitting is then employed to obtain the specific power control parameters $X_i$ and the transfer function $X_i(I_{FPD})$ of $I_{FPD}$ (step 504). This conversion function $X_i(I_{FPD})$ is written into optical information recording apparatus operating software for calculating the specific parameter values $K_i$ (step 505).

In effect, when the optical information recording apparatus adopts the optimal power calibration. Once the optimal target power $P_1$ is obtained from the optical disc, one can then get the needed specific parameter value $K_1$ using the previously obtained conversion functions $I_{FPD}(P_o)$ and $X_i(I_{FPD})$:

$$I_1 = I_{FPD}(P_1),$$

and $$K_1 = X_1(I_1).$$

If the laser diode driving chip 20 only has two sets of input channels, then from the target power $P_1$ one can compute the needed peak value $P_1 + P_2$ according to the specification of the optical information recording apparatus. The corresponding output current $I_{FPD}$ of the front monitor diode 60 should be $I_{FPD}(P_1+P_2)$, while the needed specific parameter value $K_2$ can be computed as follows:

$$K_2 = X_2(I_{FPD}(P_1+P_2)) - X_2(I_{FPD}(P_1)).$$

Similarly, if the laser diode driving chip 20 contains N sets of input channels, then the specific parameter $K_i$ for each set of channel can be computed as follows:

$$K_i = X_i(I_{FPD}(P_1+P_2+\ldots+P_i)) - X_i(I_{FPD}(P_1+P_2+\ldots+P_{i-1}))$$

Figure 6:
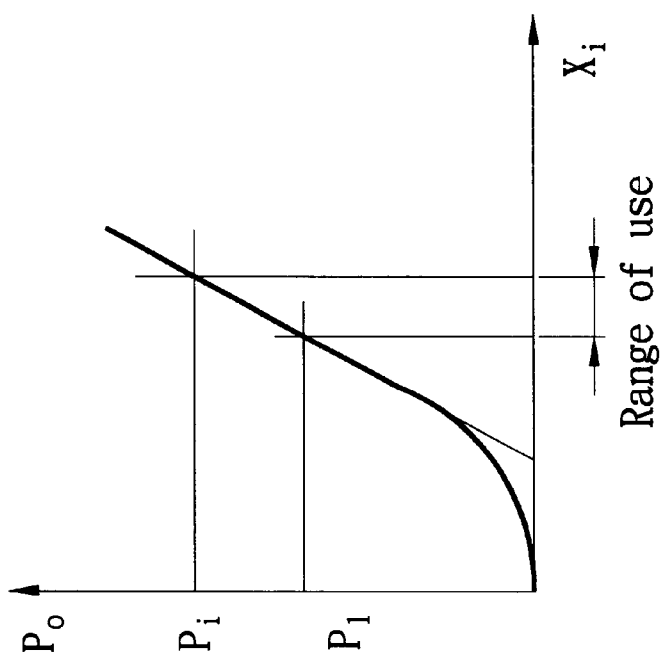
FIG. 6 shows the relation between the output power of the pickup head and the input of the optical information recording apparatus.

FIG. 6 shows the relation between the output power of the pickup head and the input of the optical information recording apparatus. It shows that the range used in the present invention has a linear relation.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An automatic calibration method for the output power of a pickup head for an optical information recording apparatus, which comprises the steps of:
   replacing the optical storage medium with an optical power meter;
   adjusting an input value gradually and recording the output current of a front monitor diode and the power reading on the optical power meter;
   building a conversion function of the input value, the power reading and the output current using curve fitting;
   providing a plurality of specific power control parameters automatically measured by a plurality of the same model optical recording apparatuses; and
   providing the usage of each set of channel of the laser diode driving chip of the optical storage medium pick up head according to the plurality of specific power control parameters.

2. The automatic calibration method of claim 1 further comprising the step of controlling the output power of the laser diode using the duty cycle method.

3. The automatic calibration method of claim 2, wherein the step of controlling the output power of the laser diode controls the average output power of the laser diode to be smaller than or equal to a critical power value.

4. The automatic calibration method of claim 1, wherein the power reading can be obtained through a peak holder.

5. The automatic calibration method of claim 1, wherein the power reading can be obtained as follows:

$$P_k = P_{av} \times (\Delta T_1 + \Delta T_2)/\Delta T_1;$$

where $P_{av}$ is the average output power, $P_k$ is the peak output power, $\Delta T_1$ is the laser diode conducting time interval, and $\Delta T_2$ is the laser diode closure time interval.

6. The automatic calibration method of claim 5, wherein $\Delta T_1 + \Delta T_2$ is determined to continuously output a plurality of periodically modulating pulses so as to obtain statistically meaningful measurement results.

7. The automatic calibration method of claim 1, wherein the conversion function contains the conversion between the input value and the output current.

8. The automatic calibration method of claim 1, wherein the conversion function contains the conversion between the output current and the power reading.

9. The automatic calibration method of claim 1, wherein the input value further corresponds to an enable input.

10. An automatic calibration method for the output power of a pickup head for an optical information recording apparatus used for optical information recording apparatuses of the same type to automatically measure the specific parameter of each power control channel and to obtain the optimal recording characteristics, which method comprises the steps of:
    replacing the optical storage medium with an optical power meter;
    adjusting an input value gradually and recording the output current of a front monitor diode and the power reading on the optical power meter:
    building a first conversion function of the power reading and the output current using curve fitting;
    building a second conversion function of the output current and the input value using curve fitting;
    providing a plurality of specific power control parameters automatically measured by a plurality of the same model optical recording apparatuss according to the first and second conversion functions; and
    providing the usage of each set of channel of the laser diode driving chip of the optical storage medium pick up head according to the plurality of specific power control parameters.

11. The automatic calibration method of claim 10 further comprising the step of controlling the output power of the laser diode using the duty cycle method.

12. The automatic calibration method of claim 11, wherein the step of controlling the output power of the laser diode controls the average output power of the laser diode to be smaller than or equal to a critical power value.

13. The automatic calibration method of claim 10, wherein the power reading can be obtained through a peak holder.

14. The automatic calibration method of claim 10, wherein the power reading can be obtained as follows:

$$P_k = P_{av} \times (\Delta T_1 + \Delta T_2)/\Delta T_1;$$

where $P_{av}$ is the average output power, $P_k$ is the peak output power, $\Delta T_1$ is the laser diode conducting time interval, and $\Delta T_2$ is the laser diode closure time interval.

15. The automatic calibration method of claim 14, wherein $\Delta T_1 + \Delta T_2$ is determined to continuously output a plurality of periodically modulating pulses so as to obtain statistically meaningful measurement results.

16. The automatic calibration method of claim 10, wherein the input value further corresponds to an enable input.

* * * * *